United States Patent Office 2,900,406
Patented Aug. 18, 1959

2,900,406

PREPARATION OF PHOSPHORODITHIOATE TRIESTERS

Paul W. Vogel, Warrensville Heights, and Norman A. Meinhardt, Euclid, Ohio, assignors to The Lubrizol Corporation, Wickliffe, Ohio, a corporation of Ohio No Drawing. Application July 2, 1954
Serial No. 441,156

2 Claims. (Cl. 260—461)

This invention relates to a novel process for the preparation of certain phosphorodithioic acid esters. In a more particular consideration, it relates to the preparation of neutral phosphorodithioate esters.

It is an object of the present invention to provide a process for the preparation of triesters of phosphorodithioic acids.

These and other objects are accomplished by the process of the present invention which comprises the reaction of a phosphorochloridothionate having the structure

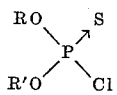

where R and R' are the same or different hydrocarbon radicals bound to the oxygen atoms through aliphatic carbon atoms, with a salt of a diorgano phosphorodithioic acid selected from ammonium and amine salts thereof.

It will be noted that the process of the present invention involves the replacement of the ammonium or amine radical by an R or R' as described above.

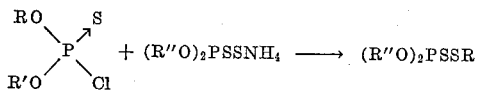

The disposition of the rest of the phosphorochloridothionate is not understood, and while it is suspected that it may be converted ultimately to a metathiophosphate residue, this is conjecture and is offered only as a theoretical explanation.

The phosphorochloridothionates which comprise one of the two reactants in the process are prepared from the corresponding phosphorodithioic acids by reaction with chlorine:

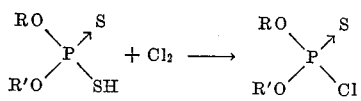

As indicated previously, the R and R' groups are hydrocarbon radicals bound to the oxygen atoms through aliphatic carbon atoms. In most instances the R and R' groups will be alkyl groups such as methyl, ethyl, propyl, isopropyl, butyl, amyl, hexyl, octyl, etc., although the scope of the invention is such as to contemplate also the aralkyl and cycloalkyl groups. These are illustrated by the following specific examples: benzyl, phenylethyl, xylyl, cyclohexyl, methylcyclohexyl, hexylcyclohexyl, etc.

The salt of the di-organo phosphorodithioic acid may be prepared by mixing the free acid with ammonia or a substituted ammonia. This may be done prior to treating with the phosphorochloridothionate or it may be done simultaneously with such treatment. That is, the di-organo phosphorodithioic acid and ammonia or amine may be mixed first and then treated with the acid chloride, or alternatively the acid and acid chloride may be mixed first and then treated with the ammonia or amine.

The di-organo phosphorodithioic acids are well-known in the art and may be prepared most conveniently by the reaction of organic hydroxy compounds with $P_2S_5$. Thus phenol, alkylated phenols, naphthols, alkylated naphthols, aliphatic alcohols, cycloaliphatic alcohols, araliphatic alcohols and the like may be employed in the preparation thereof.

In the process of the invention, the optimum mole ratio of reactants; i.e., acid chloride to acid salt, is governed by the apparent availability of but one hydrocarbon group as an esterifying radical from the phosphorochloridothionate molecule. Thus the optimum mole ratio is 1:1, and accordingly this is the preferred ratio, although deviations therefrom are contemplated as well, since they are operative. In such latter instances, that portion of the reactant which is in excess does not interfere with the course of the desired reaction.

The use of a solvent is frequently advantageous in view of the ordinary problems of heat control and ultimate isolation of the product, generally any of the ordinarily inert solvents such as benzene, toluene, xylene, ether, dioxane, chloroform, carbon tetrachloride, etc. are quite satisfactory. Of these benzene and dioxane have been used with particular satisfaction.

The temperature of the reaction usually is that of the refluxing solvent, or in the absence of a solvent it may be adjusted within the range of 50–175° C. In view of the fact that, as indicated above, the reaction generally is carried out in a solvent and that this solvent frequently is benzene or dioxane it will be noted that the temperature of the reaction is most desirably in the range of the boiling points of these solvents, or from about 75° C. to about 110° C.

As to the duration of the process, it appears that while in most cases the reaction is substantially complete within two or three hours, in other instances a much longer time is required. Generally from about two to about forty hours are sufficient.

The present process may be further illustrated by the following examples which are not to be construed as limiting the scope of the invention.

*Example 1*

A solution of 88.6 grams (0.2 mole) of the triethyl amine salt of O,O-di-n-butyl phosphorodithioic acid and 19 grams (0.1 mole) of O,O-diethyl phosphorochloridothionate in 100 ml. of dioxane was heated on a steam bath (85° C.) for 2.5 hours. The cooled mixture was filtered and the solid washed with ethyl ether. The combined ether and dioxane filtrates were allowed to stand for some time and then were decanted from a syrupy deposit. The decanted solution was concentrated at steam bath temperature and poured into 5 percent aqueous hydrochloric acid. The tri-ester product was extracted with ethyl ether and the ether extract was dried with sodium carbonate and concentrated. The residue was distilled, yielding 34.4 grams (127 percent of the apparent theoretical yield) of a liquid which boiled at 102–105°/0.28 mm. and was shown to be O,O-di-n-butyl S-ethyl phosphorodithioate by the following analyses:

Percent sulfur _____ 24.5
Percent phosphorus _____ 11.2
$n_D^{25}$ _____ 1.4939

The relatively high yield obtained in this example indicates that the phosphorochloridothionate is supplying more than one stoichiometric equivalent of ethyl group, in which case the yield actually is 64 percent.

*Example 2*

A solution of 21.6 grams (0.1 mole) of O,O-diisopropylphosphorochloridothionate and 55 grams (0.2 mole) of the triethyl amine salt of O,O-diethyl phosphorodithioic acid in 100 ml. of dioxane was heated on a steam bath for 4.5 hours. The cooled mixture was filtered and the solid washed several times with dioxane and ethyl ether. The combined filtrates were diluted with low-boiling petroleum ether to a volume of 1400 ml. and allowed to stand until a syrupy liquid had settled from solution. The supernatant liquid was decanted, then concentrated on a steam bath and the residue was dried with sodium carbonate, then distilled. The yield of O,O-diethyl S-isopropyl phosphorodithioate was 22.6 grams (99 percent of the theoretical yield), and its analyses were as follows:

| | |
|---|---|
| Percent sulfur | 28.4 |
| Percent phosphorus | 13.5 |
| $n_D^{25}$ | 1.4970 |

Example 3

A solution of 38 grams (0.2 mole) of O,O-diethyl phosphorodithioic acid, 20.2 grams (0.2 mole) of triethyl amine, and 43.3 grams (0.2 mole) of O,O-di-n-propyl phosphorochloridothionate in 100 grams of benzene was heated at reflux temperature for two hours. The cooled product mixture was filtered and the filtrate concentrated on the steam bath at reduced pressure. Distillation of the residue yielded 10.0 grams (22 percent of the theoretical yield) of a liquid boiling at 54°/0.09 mm. It was shown to be O,O-diethyl-S-n-propyl phosphorodithioate by the following analyses:

| | |
|---|---|
| Percent sulfur | 26.7 |
| Percent phosphorus | 13.7 |
| $n_D^{25}$ | 1.4966 |

Example 4

A solution of 39.2 (0.2 mole) of O,O-diethyl phosphorodithioic acid, 20.2 grams (0.2 mole) of triethyl amine, and 21.7 grams (0.1 mole) of O,O-diisopropyl phosphorochloridothionate in 100 grams of dioxane was heated at reflux temperature for three hours. The cooled mixture was poured into 500 ml. of water and the resulting mixture was extracted with ethyl ether. The ether extract was concentrated and distilled. The yield of O,O-diethyl S-isopropyl phosphorodithioate was 18.2 grams (79 percent of the theoretical yield). Its analyses were:

| | |
|---|---|
| Percent sulfur | 29.5 |
| Percent phosphorus | 13.9 |
| $n_D^{25}$ | 1.4995 |

Example 5

A solution of 47.4 grams (0.2 mole) of O,O-di-sec-butyl phosphorodithioic acid, 20.2 grams (0.2 mole) of triethyl amine, and 25.0 grams (0.1 mole) of O,O-dicyclohexyl phosphorochloridothioate in 100 grams of dioxane was heated on a steam bath for 29 hours, then poured into 400 ml. of water. This mixture was extracted with ethyl ether and the ether extract was concentrated, then distilled. A total of 14.3 grams of O,O-di-sec-butyl S-cyclohexyl phosphorodithioate was obtained; it boiled at 90–92° C./0.2 mm. and showed the following analyses:

| | |
|---|---|
| Percent sulfur | 20.5 |
| Percent phosphorus | 10.6 |
| $n_D^{25}$ | 1.5060 |

Other modes of applying the principle of the invention may be employed, change being made as regards the details described, provided the features stated in any of the following claims, or the equivalent of such, be employed.

We therefore particularly point out and distinctly claim as our invention:

1. The process of preparing triesters of phosphorodithioic acids which comprises reacting at a temperature within the range of 50–175° C. a phosphorochloridothionate having the structure

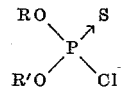

where R and R' are selected from the class consisting of cycloalkyl and alkyl radicals, with the triethyl amine salt of a dialkyl phosphorodithioic acid.

2. The process of claim 1 characterized further in that R and R' are lower alkyl radicals.

References Cited in the file of this patent

UNITED STATES PATENTS 2,410,118   Woodstock et al. _____ Oct. 29, 1946

OTHER REFERENCES

Organophosphorus Compounds, Kosolapoff, Wiley & Sons, Inc., N. Y. (1950), p. 231.